Feb. 28, 1967    TOYOMASA MINEGISHI    3,306,449
HIGH SPEED PRECIPITATING APPARATUS
Filed Jan. 16, 1963    4 Sheets-Sheet 1

INVENTOR.
Toyomasa Minegishi
BY
Woodhams Blanchard & Flynn
ATTORNEYS

Feb. 28, 1967 TOYOMASA MINEGISHI 3,306,449
HIGH SPEED PRECIPITATING APPARATUS
Filed Jan. 16, 1963 4 Sheets-Sheet 2
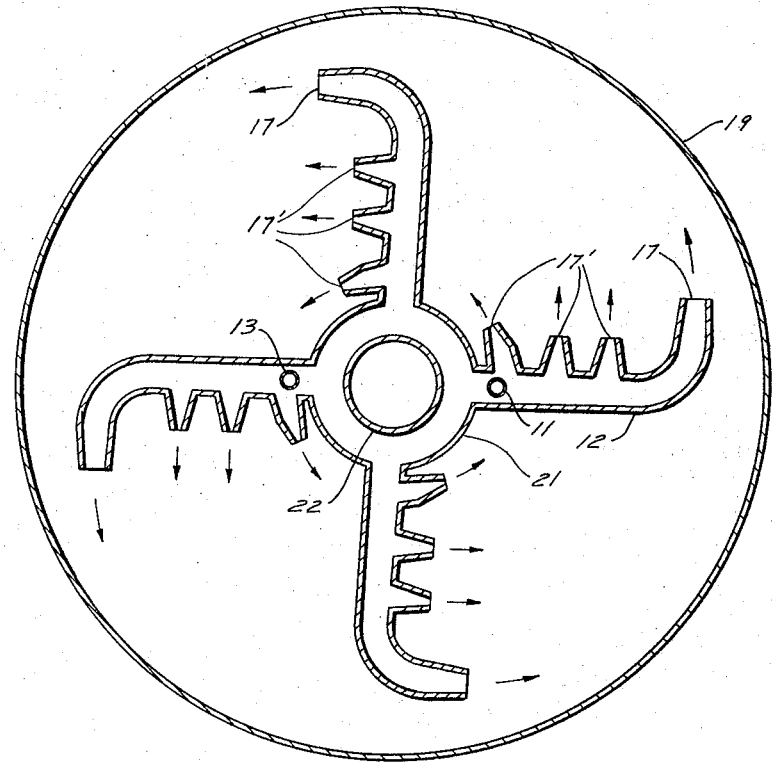
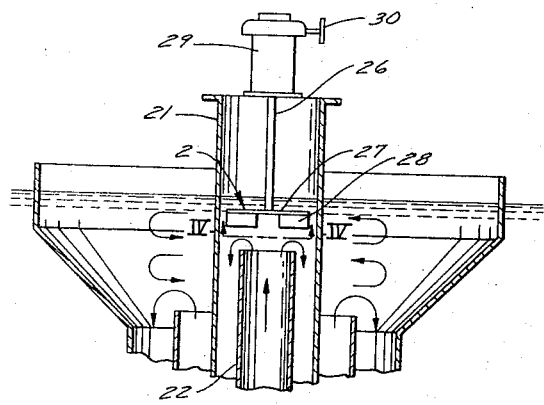
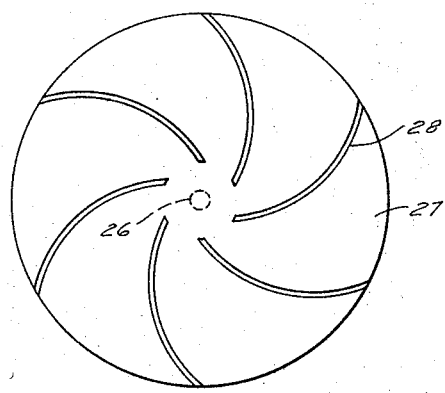
INVENTOR.
Toyomasa Minegishi
BY
ATTORNEYS Feb. 28, 1967  TOYOMASA MINEGISHI  3,306,449
HIGH SPEED PRECIPITATING APPARATUS Filed Jan. 16, 1963  4 Sheets-Sheet 3

INVENTOR.
Toyomasa Minegishi
BY
Woodhams Blanchard & Flynn
ATTORNEYS

Feb. 28, 1967 TOYOMASA MINEGISHI 3,306,449
HIGH SPEED PRECIPITATING APPARATUS
Filed Jan. 16, 1963 4 Sheets-Sheet 4

INVENTOR.
Toyomasa Minegishi
BY
Woodhams Blanchard & Flynn
ATTORNEYS

United States Patent Office 3,306,449
Patented Feb. 28, 1967

3,306,449
HIGH SPEED PRECIPITATING APPARATUS
Toyomasa Minegishi, Tokyo, Japan, assignor to Toyo Engineering Corporation, Tokyo, Japan, a corporation of Japan
Filed Jan. 16, 1963, Ser. No. 251,777
19 Claims. (Cl. 210—123)

This invention relates to a high speed precipitation apparatus intended for use in a flocculating precipitation system which system is adapted especially for the treatment of water, including drinking water, industrial water, factory waste liquids, sewage and the like.

There are various known procedures for treating water including the flocculating precipitation method, the flotation method, the filtration method and the ion exchange method. The flocculating precipitation method has been widely used and various apparatuses for carrying out this procedure are known. As is well known, the flocculating precipitation method is based on the principle that a coagulating reaction is effected by dissolving a conditioning agent, such as an electrolyte, e.g. sulphuric acid, into a liquid containing highly dispersed, fine, cooloid particles so that ionized and even non-ionized fine particles may combine together so that they become flocculated and, thus, can precipitate.

A most important requirement of apparatus for carrying out such a procedure is that the conditioning agent solution and the solution to be treated must be agitated and intimately and uniformly mixed together. Commonly a mechanical, power operated agitator is used for this purpose. Almost all of the presently known vertical flocculating precipitation apparatuses use such agitators. However, these are not completely satisfactory because they have a limited mechanical efficiency and involve a large power cost.

I have discovered that it is possible to achieve high satisfactory mixing by providing a high speed precipitation apparatus in which circulating currents are created in a tank without using a mechanical, power-driven agitator but, rather, by utilizing as a power source the potential energy of the liquid to be treated, i.e., the head or pump pressure of the liquid to be treated, and by utilizing the floating force of bubbles of gas injected into the liquid by means of an air compressor or the like and by providing suitable flow-directing means within the tank so that turbulent currents, eddy currents, dispersed currents, alternating currents and/or rotating currents are produced so that agitation and mixing take place quickly at a high efficiency.

Therefore, an object of the present invention is to provide a flocculating precipitation apparatus in which the steps of quick or slow agitation, flocculation, rectification, precipitation and separation can be effected by using the potential energy of the liquid to be treated and by using the floating force of bubbles injected into the liquid and without using a mechanically driven agitator.

Another object of the present invention is to provide a precipitation apparatus in which high speed precipitation can be effected by producing circulating currents in a precipitating tank and by adding flocks previously produced by flocculation to the fresh liquid to be treated as it enters the apparatus.

A further object of the present invention is to provide a precipitation apparatus in which clean water and sludge can be more effectively separated from each other by using the flocculated particles to form a filtering layer in a separating chamber.

A further object of the present invention is to provide a precipitation apparatus in which exposure of the liquid to be treated to air can be effectively made simultaneously with the flocculation procedure.

A further object of the present invention is to provide a high speed precipitation apparatus in which the time required for agitation, mixing, rectification and precipitation can be minimized.

Another object of the present invention is to provide a precipitation apparatus in which the collection and removal of settled sludge and the removal of floating flocks can be easily carried out.

A further object of the present invention is to provide a precipitation apparatus which is of relatively simple construction and in which the costs of construction, maintenance and control are low.

Other objects of the present invention will become apparent to persons acquainted with equipment of this type upon reading the following description and inspecting the accompanying drawings.

In the drawings:

FIGURE 2 is a sectional view taken on the line II—II of FIGURE 1.

FIGURE 3 is a view corresponding to a fragment of FIGURE 1 showing a modification.

FIGURE 4 is a view taken along the line IV—IV of FIGURE 3.

Figure 1:
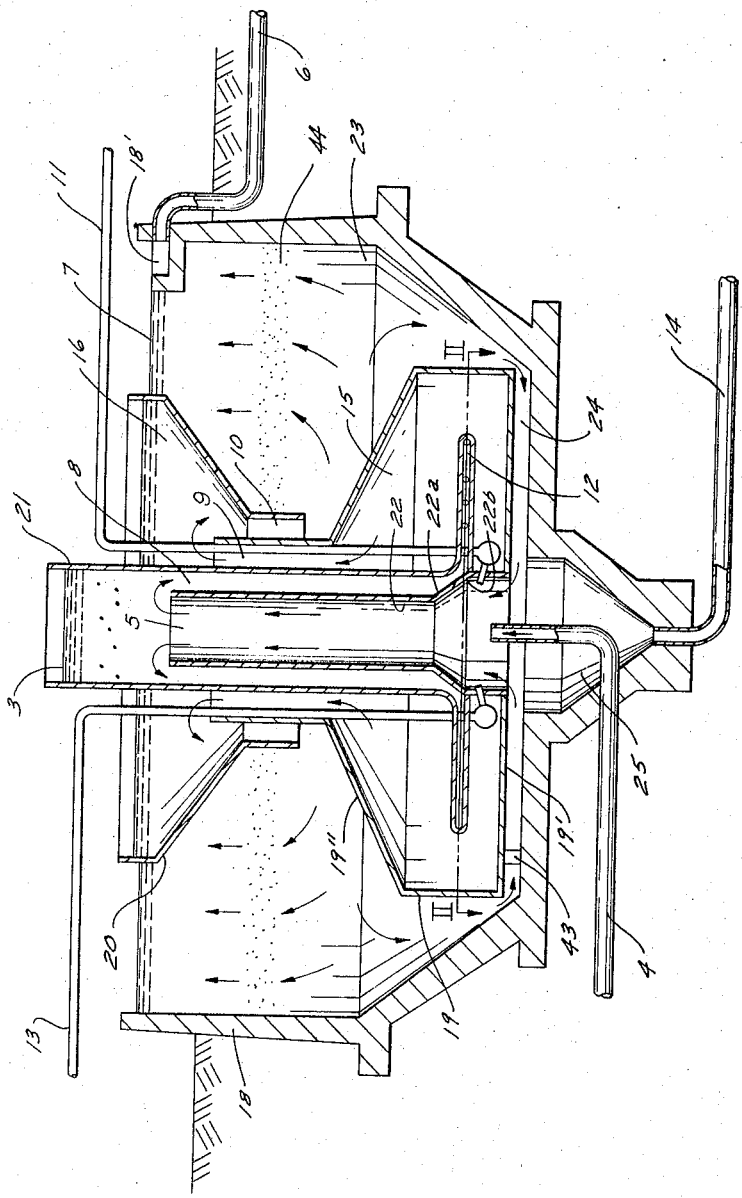
FIGURE 1 is a view in vertical central cross-section of one embodiment of the invention.

The apparatus of the present invention includes a material solution feeding pipe which communicates with the central lower part of an outer tank body. An inner cylindrical body extends upwardly in the center of said outer tank body above said feeding pipe. An outer cylindrical body surrounds the inner cylindrical body and is secured thereto at its lower end so that a first annular zone is provided between said cylindrical bodies. Said zone is open at its upper end and is closed at its lower end except for a plurality of jetting nozzles thereon. A conical inner tank body, whose bottom wall is secured to the lower end of the inner cylindrical body, surrounds the outer cylindrical body so that a flocculating and mixing chamber is formed by and between the inner tank body and the lower portion of the outer cylindrical body, and a second annular zone is provided therebetween along the upper portion of said outer cylindrical body.

An inverted, conical rectifying tube body, which is open at its upper end, surrounds the upper portion of the inner tank body and forms therewith a third annular zone. A precipitating and separating chamber is formed by the outer tank body and the liquid flowing through said third annular zone flows into said chamber. An overflow trough for taking out the clean liquid is arranged in the upper part of the outer tank body and a sludge discharging pipe is arranged in the center of the bottom part. A flocculating agent feeding pipe and a pipe for feeding a gas, such as air, communicate with the lower part of the inner cylindrical body. The bottom wall of the inner tank body is fixed to and supported upon the bottom wall of the outer tank body so that a circulating fluid passage is provided between them.

When a material solution to be treated and a flocculating agent chemical solution are fed into the lower end of said inner cylindrical body together with a gas in the form of bubbles, the material solution and the chemical solution will rise in said inner cylindrical body while being vigorously agitated and mixed by the action of the rising force of the solutions and the floating force of the bubbles. Thus, the material solution and the chemical solution will be uniformly agitated and mixed in the inner cylindrical body and the chemical reaction will be performed quickly and effectively. The potential energy of the rising liquids and the floating force of the bubbles will provide the motive power for all of the actions required for the flocculation and precipitation in the apparatus. The mixed solutions rising in the inner cylindrical body will discharge a part of the bubbles into the atmosphere in the upper part of said inner cylindrical body. The mixed solution then will pass downwardly through the first annular zone and then will be jetted into the comparatively spacious mixing and flocculating chamber through the liquid flow jetting ports on the periphery of the lower part of the outer cylindrical body. The jetting currents will collide at respectively fixed angles with the side wall of the mixing and flocculating chamber and will disperse and form eddy currents, turbulent currents and rotating currents which will increase the number of collisions of the flocks. As a whole the flow of the mixed solution in the mixing and flocculating chamber will be upwardly vortical.

In the mixing and flocculating chamber, adsorption and combination of the flocks will be effected quickly and clean water will separate from the flocks. The rotating rising stream will enter the rectifying chamber wherein the remaining bubbles will be substantially all discharged out of the solution. Further, the lighter than water flocks will form a scum floating in the upper part of the rectifying chamber and such can be removed from the tank by any proper means. Due to the residual velocity energy of the stream after the bubbles are thus discharged, the stream current will again move downwardly through the third zone while slowly rotating and will flow into the spacious precipitating and separating chamber. The stream entering tthe precipitating and separating chamber will have three force components acting on it, namely, a component urging it to rise due to the inflow of the material solution, a component urging it to move circumferentially in the chamber and a component urging it to move downwardly due to the sucking force of the materials being injected upwardly into the inner cylindrical body. Because of these three components, the flocculated flocks will form a more or less planar, annular filtering layer at a level about, at or above the point where the stream enters the precipitating and separating chamber. The flocks will be drawn downwardly and will flow to the center of the bottom part of the tank. On the other hand, the liquid will separate from the flocks, will be filtered by said filtering layer so that it will become clean water, and then it will rise spirally in the chamber and will flow out of the tank through the overflow trough provided in the outer tank body. The sludge carried to the center of the bottom part of the tank will be partly discharged through tthe sludge discharging pipe. The remaining flocks will be drawn into the newly supplied solutions and will be agitated and mixed therewith and will be recycled through the apparatus.

Referring to FIGURE 1, 18 is an outer tank body, 19 is an inner tank body, 20 is a rectifying tube body, 21 is an outer cylindrical body and 22 is an inner cylindrical body. 4 is material solution feeding pipe, 11 is a conditioning agent feeding pipe and 13 is an air feeding pipe. 6 is a clean liquid discharge pipe.

The outer tank body 18 has a cylindrical upper part and a lower part in the shape of an upwardly expanding truncated cone. An overflow trough 18' having a dam is provided along a part or the whole of the inner periphery of the upper edge of the outer tank body 18. The clean liquid discharge pipe 6 is connected to the trough 18'. A conical recess forming a sludge pool 25 is provided in the center of the bottom wall of the outer tank body 18. A sludge discharge pipe 14 is connected to said recess 25. The material solution feeding pipe 4 extends through the wall of the sludge pool 25 and thence extends upwardly and its open upper end is located a slight distance above the bottom wall of the tank body 18. The inner cylindrical body 22 extends upwardly in the central part of the tank body 18 and is open at its upper and lower ends. The cylindrical body 22 has a downwardly flaring skirt 22a at its lower end.

The outer cylindrical body 21 surrounds the inner body 22 and has an open upper end which extends above the upper end of tank 18. The lower end of the outer body 21 has a plurality of substantially radially extending arms 12 and said lower end is secured to the skirt 22a so that the annular zone between the bodies 21 and 22 is closed at its lower end except for the nozzles in the arms 12 as hereinafter further described.

The inner tank body 19 is disposed within the outer tank body 18 and surrounds the outer cylindrical body 21. The tank body 19 has a cylindrical upper part, a middle part made in the shape of a downwardly expanding truncated cone and a cylindrical lower part. The upper end of tank body 19 is open and the bottom wall thereof is secured to the lower end of the skirt 22a of the inner cylindrical body 22. The bottom wall of the inner tank body 19 is secured to the bottom wall of the outer tank body 18 by means of brackets or other supporting metal fixtures 43 so as to provide the proper spacing between the tank bodies whereby a passage 24 is provided therebetween.

The flocculating agent feed pipe 11 and the gas feeding pipe 13 have outlets communicating with openings 22b in the skirt part 22a of the inner cylindrical body 22 and are disposed in proper positions so that the flocculating agent and gas may be respectively injected into the lower end of the inner cylindrical body 22.

The rectifying tube body 20 has a lower cylindrical part surrounding the upper part of the tank body 19, a middle part in the shape of an upwardly expanding truncated cone and an upper cylindrical part. The rectifying tube body 20 is open at its upper and lower ends and is supported in proper spaced relation with respect to the tank body 19 by suitable supports (not shown). The inner tank body 19, the inner cylindrical body 22, the rectifying tube body 20 and the outer cylindrical body 21 are positioned with their upper ends progressively higher in the order mentioned, the upper ends of the former two being lower than the dam provided in the overflow trough 18' and those of the latter two being higher than said dam.

Therefore, the material solution fed into the lower part of the inner cylindrical body 22 through the material solution feeding pipe 4, will rise in the high speed agitating chamber 5 defined by the inner cylindrical body 22 while being well agitated and mixed by the rising action of the bubbles of gas, such as of air, oxygen and ozone, fed through the gas feeding pipe 13 together with the flocculating agent fed through the flocculating agent feeding pipe 11 and the circulating liquid coming through the passage 24 between the bottom walls of the inner and outer tank bodies. The liquid will be well agitated and the bubbles and flocculating agent will come into contact with the fine particles in the liquid so that chemical and biochemical reactions may take place. As a result of the pressures of the incoming material solution, gas and flocculating agent, the level 3 of the material solution in the outer cylindrical body 21 will be kept higher than the height of said dam and a head difference with respect to the level 7 of the material solution outside the outer cylindrical body 21 will be produced. The material solution reaching the upper part of the outer cylindrical body 21 will discharge to the atmosphere a part of the gas bubbles in the liquid. The material solution will then pass downwardly through the first annular zone 8 between the inner and outer cylindrical bodies 22 and 21 because of said head difference and it will be fed into the mixing and flocculating chamber 15 in the lower part of the inner tank body 19 through the nozzles 17 and 17' (FIGURE 2) on the arms 12 on the lower part of the outer cylindrical body 21. The nozzles 17 and 17' are so designed that the material solution may be given a proper circulatory movement as it enters the inner tank body 19.

The material solution fed into the inner tank body 19 through the nozzles 17 and 17' will usually have a part of the gas bubbles entrained therein and will form, on the whole, a circumferentially moving and rising, somewhat vertical current stream therein. However, eddy currents, turbulent currents and rotating currents also will be produced so that the material solution will be well mixed and exposed to the gas and will form flocks. Then the material solution will again move circumferentially and rise in the second annular zone 9 (FIGURE 1) between the walls of the upper part of the inner tank body 19 and the outer cylindrical body 21 and will be led into the rectifying chamber 16 in the rectifying tube body 20. The material solution will become a slowly circumferentially moving current in the rectifying tube body 20, will be well deaerated therein with the gas passing to the atmosphere, will then move downwardly through the third annular zone 10 formed between the walls of the cylinder in the lower part of the rectifying tube body 20 and the cylindrical upper part of the inner tank body 19 and will be made to flow into the precipitating and separating chamber 23 formed by and between the walls of the outer tank body 18, the rectifying cylindrical body 20 and the inner tank body 19. In said chamber 23, the material solution will form a rising, circumferentially moving current in the upper portion of said chamber and a falling, circumferentially moving current in the lower portion of said chamber. That is to say, in and around the third annular zone 10, a horizontally circumferentially moving current will be formed. An annular filtering layer 44 formed of the flocks liberated from the material solution will be produced and it will perform a filtering action on the liquid flowing therethrough. The liquid reaching the upper part of the chamber 23 will be clean and it will be moving in a rising, circumferential path. On the other hand, due to the sucking action caused by the materials rising in the inner cylindrical body 22, the material solution in the lower part of chamber 23, containing a large amount of flocks, will be drawn downwardly. It will pass through the passage 24 and will be mixed in the inner cylindrical body 22 with the material solution being newly fed thereinto. The sludge in the circulating liquid will settle and it will be accumulated in the sludge pool 25 for discharge through the pipe 14.

The solution thus cleaned will be removed through the overflow trough 18' and the clean solution discharge pipe 6. The sludge will be removed through the sludge discharge pipe 14.

The most suitable operation can be obtained by so designing the apparatus that the velocity of the material solution falling down through the third annular zone 10 is 0.08 to 0.12 m./sec. at a point leaving the zone 10. The angle of inclination of the outer wall surface of the middle part 19" of the inner tank body 19 may be from 12 to 30 degrees and the amount of the circulating liquid flowing through the passage 24 should be two to four times as large as the amount of the material solution newly flowing in.

The purpose of the arms 12 having nozzles 17 and 17' provided at the lower end of the outer cylindrical body 21 is as described above to accelerate the flocculating reaction, cause turbulent currents, eddy currents and rotating currents and increase the frequency of collisions of flocculated fine particles in the mixing and flocculating chamber 15 in the inner tank body 19. Therefore, the number, dimensions and orifice directions of the nozzles can be freely determined in a range so as to achieve this purpose. However, it is preferable to provide several main nozzles of a comparatively large orifice diameter and a plurality of auxiliary nozzles of a comparatively small orifice diameter for each main nozzle. In FIGURE 2, the main nozzles are shown in 17 and the auxiliary nozzles are shown at 17'. The auxiliary nozzles 17' facilitate the operation of the main nozzle 17.

It is also preferable to provide a guide plate at a proper location in the upper part of the outer cylindrical body 21 so as to turn the material solution rising in the high speed agitating chamber 5 in the inner cylindrical body 22 and to help direct it into the first zone 8. Such a guide plate is mounted so that its vertical position can be adjusted whereby the clearance between the plate and the upper end of the inner cylindrical body 22 can be adjusted. Such an adjustment is made in order to achieve the best operation taking into account the amount of the gas liberated from the body 21 and the amount of liquid circulating. Thus, referring to FIGURE 3, the rising material solution will contact a guide plate 2 and will be directed thereby in a downward and circumferential direction so that it will flow down into the first annual zone 8. The structure of the turning guide plate 2 comprises a plurality of strips 28 in the form of radially extending, circumferentially curved lines fixed to the lower surface of a disk 27 supported by a spindle 26 which in turn is supported by a headstock 29 mounted on the upper end of the outer cylindrical body 21. The turning guide plate 2 is vertically adjustable by vertical movement of the headstock 29 with the handle 30. Thus, in its operation, the velocity and volume of the liquid flowing through the apparatus can be adjusted by vertically moving the headstock 29 by use of a handle 30 without requiring any mechanical power.

Figure 5:
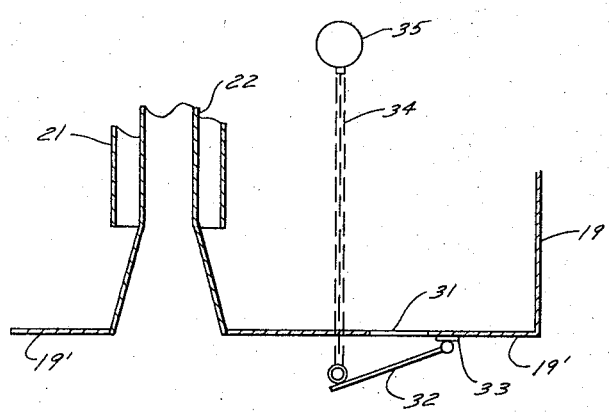
FIGURE 5 is a view corresponding to a fragment of FIGURE 1 showing another modification.

Further, in using the apparatus of the present invention, in order to prevent damage to the inner tank body 19 at the time of starting to feed the material solution and to discharge the residual solution in the inner tank body 19 after stopping the operation, it is preferable to provide a valve in the bottom wall of the inner tank body 19. The valve is mounted so that it can be automatically opened and closed in response to the level of the liquid in the tank body 19. Thus, referring to FIGURE 5, an opening 31 is provided in the bottom wall 19' of the inner tank body 10 and a valve plate 32 is hingedly connected at one end thereof by a hinge 33 to said bottom wall. A float 35 is connected to valve plate 32 by a chain 34 so that the opening 31 is automatically opened and closed by said valve in response to the level of the liquid in the tank body 19.

Figure 6:
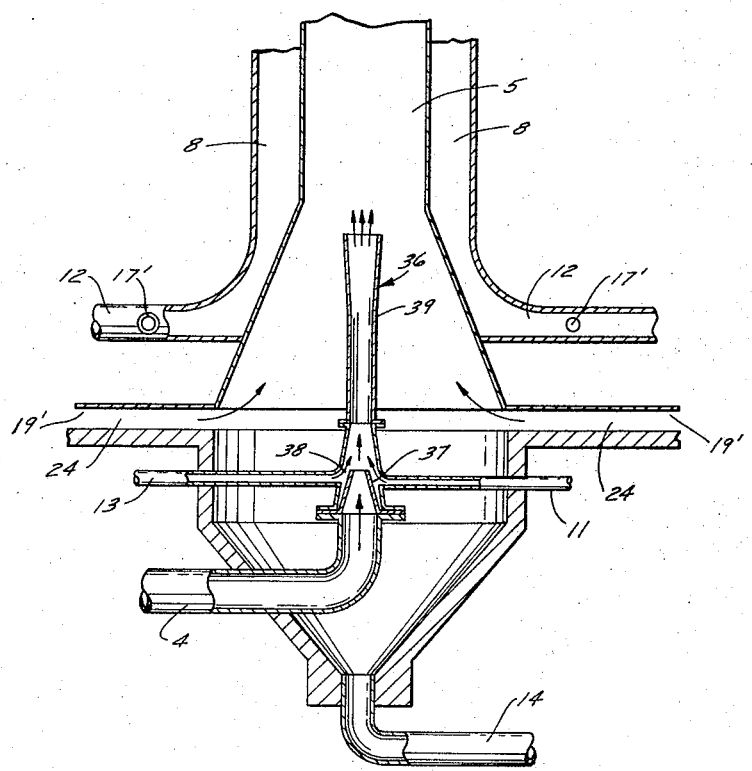
FIGURE 6 is a view corresponding to a fragment of FIGURE 1 showing still another modification.

Further, for feeding the material solution into the apparatus of the present invention, the material solution feeding pipe 4 can open directly into the lower end of the high speed agitating chamber 5 in the inner cylindrical body 22 as shown in FIGURE 1. However, in order to further increase the effect of the high speed agitation in some kind of the material solution, the material solution can be fed in by providing a jetting device at the discharge end of the material solution feeding pipe 4. Thus, referring to FIGURE 6, the material solution will be fed to a jetting device 36 which extends vertically in the center of the bottom part of the outer tank body 19 and will quickly be accelerated to a velocity several times as high as its velocity in pipe 4 without reducing the amount of flow. The jetting device 36 comprises a nozzle 37, a jetting chamber 38 surrounding said nozzle, and a lead pipe 39 having a flaring discharge end fitted to the forward end of said jetting chamber. The air feeding pipe 13 and the chemical solution feeding pipe 11 are here connected to said jetting chamber 38. The jetting chamber 38 will be placed under a negative pressure by the material solution flowing through the discharge end of the nozzle 37. Gas and the chemical solution will be drawn through the pipes 13 and 11, respectively, and will be mixed with the solution in the lead pipe 39.

Figure 7:
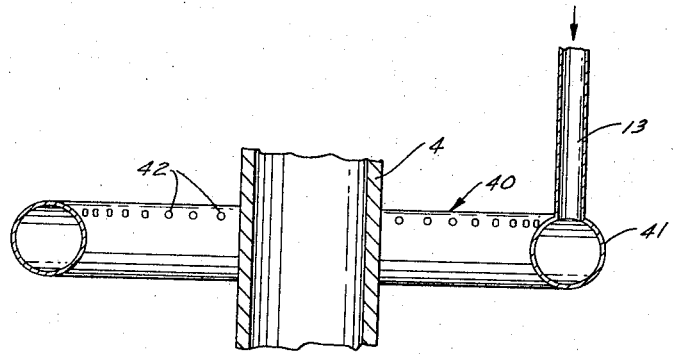
FIGURE 7 is a view on an enlarged scale of a fragment of FIGURE 1 and taken along the line VII—VII of FIGURE 8.
Figure 8:
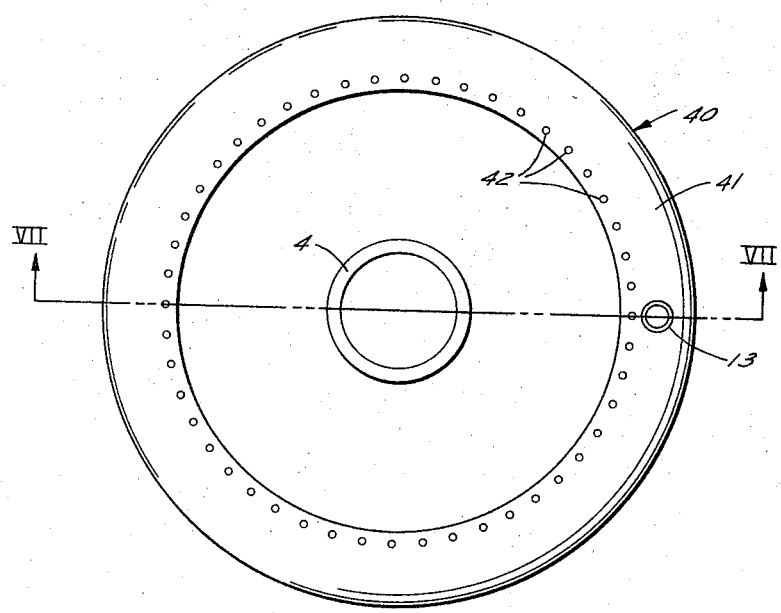
FIGURE 8 is a plan view of the parts shown in FIGURE 7.

Further, in the apparatus of the present invention, the air feeding pipe 13 may directly communicate with the lower end of the high speed agitating chamber 5 in the inner cylindrical body 22 as shown in FIGURE 1. But, in order to further increase the effects of agitation by air and of air lift, it is desirable to provide an air diffuser at the end of the feeding pipe 13 surounding the discharge end of the material solution feeding pipe 4. Such an arrangement is illustrated in FIGURES 7 and 8. The air diffuser 40 is comprised of an annular pipe 41 to which is connected the air feeding pipe 13. Further, a large number of small, upwardly and inwardly directed holes 42 are provided on the inner peripheral surface of said annular pipe 41. Air will enter the annular pipe 41 from the air feeding pipe 13, will be discharged directly inwardly and diagonally upwardly toward the forward end of the material solution feeding pipe 4 through the small holes 42 and will be uniformly agitated and mixed with the material solution.

As described above, in the present invention, agitation, mixing, precipitation and separation can be effectively carried out without using any mechanical power at all. The installation and maintenance of the apparatus itself are simple and easy and the apparatus can operate continuously in an effective fashion.

Further, the apparatus of the present invention can be used not only as a precipitating apparatus using a flocculating agent but also for mixing a small amount of a chemical solution in a large amount of a material solution, as in the softening treatment of hard water. It is also very effective as an apparatus for carrying out such chemical reactions as oxidation, reduction and neutralization in general.

What is claimed is:
1. An apparatus for treating a liquid, comprising:
an outer tank body;
a material solution feeding pipe extending upwardly in the central region of said outer tank body at the bottom thereof;
an inner cylindrical body extending upwardly in said outer tank body above said feeding pipe;
an outer cylindrical body surrounding said inner cylindrical body and defining therewith a first upright narrow zone which is open at its upper end;
an inner tank body surrounding said outer cylindrical body and having a cylindrical upper part defining with said outer cylindrical body a second upright narrow zone which is open at both ends, the lower part of said inner tank body being enlarged to form a condensing and mixing chamber, said inner tank body having a bottom wall secured to said inner cylindrical body so that said inner tank body is closed at its lower end, said bottom wall of said inner tank body being spaced above said outer tank body to provide a passage therebetween which communicates with the lower end of said inner cylindrical body;
a plurality of liquid flow jetting ports comprised of a plurality of non-radially directed nozzles at the lower end of the outer cylindrical body, said nozzles having axes which extend at least in part horizontally for directing liquid circumferentially from the lower end of said first zone into said condensing and mixing chamber, the lower end of said first zone being closed except for said jetting ports;
a rectifying tube body having a cylindrical lower part surrounding the upper part of said inner tank body and defining therewith a third, upright narrow zone which is open at both ends, the upper part of said rectifying tube body being enlarged;
the sidewall of said outer tank body being spaced from said inner tank body and said rectifying tube body to define an enlarged precipitating and separating chamber;
means for withdrawing clean liquid from the upper end of said outer tank body;
means for withdrawing sludge from the central region of the bottom of said outer tank body;
means for feeding a flocculating agent and means for feeding a gas to the lower end of said inner cylindrical body.

2. An apparatus according to claim 1, in which the inner cylindrical body has a downwardly expanding skirt at the lower end thereof.

3. An apparatus according to claim 2, in which the bottom part of the outer cylindrical body is secured to said skirt of said inner cylindrical body.

4. An apparatus according to claim 2, in which the flocculating agent feeding means and the gas feeding means are pipes which communicate through openings in said skirt with the bottom of said inner cylindrical body.

5. An apparatus according to claim 2, in which the inner periphery of the bottom wall of said inner tank body is secured to the lower end of said skirt.

6. An apparatus according to claim 1, in which the inner tank body has a cylindrical upper part, a downwardly expanding truncated cone shape in its middle part and a cylindrical lower part.

7. An apparatus according to claim 1, in which the rectifying tube body has a cylindrical lower part, an upwardly expanding truncated cone shape in its middle part and a cylindrical upper part.

8. An apparatus according to claim 1, in which the upper ends of said outer cylindrical body, said rectifying tube body, said inner cylindrical body and said inner tank body are progressively higher in the order named.

9. An apparatus according to claim 1, in which the liquid flow jetting ports comprise several main nozzles of a comparatively large orifice diameter and a plurality of auxiliary nozzles of a comparatively small orifice diameter provided for each main nozzle.

10. An apparatus according to claim 1, in which a rotatable guide plate is provided within the upper part of said outer cylindrical body.

11. An apparatus according to claim 10, in which the rotatable guide plate consists of several strips, each in the form of a radially extending, circumferentially curved line, fixed to the lower surface of a disk supported by a spindle and means for adjusting the vertical position of said guide plate with respect to said outer cylindrical body.

12. An apparatus according to claim 1, in which a valve is provided in the bottom wall of said inner tank body.

13. An apparatus according to claim 12, in which the valve is automatically opened and closed by means of a float disposed in the inner tank body and connected to the valve.

14. An apparatus according to claim 1, including jetting device comprising an upright upwardly converging nozzle connected to the discharge end of said material solution feeding pipe, means defining an upwardly converging jetting chamber surrounding and extending upwardly beyond the upper end of said nozzle and an upright lead pipe fitted to the upper discharge end of said jetting chamber.

15. An apparatus according to claim 14, in which the flocculating agent feeding means and the gas feeding means are pipes which open into said jetting chamber.

16. An apparatus according to claim 1, in which an air diffusing pipe is connected to the discharge end of the gas feeding means.

17. An apparatus according to claim 16, in which said air diffusing pipe is an annular pipe surrounding the forward end of said material solution feeding pipe, said annular pipe having a large number of holes directed diagonally upwardly on the inner peripheral surface of said annular pipe.

18. An apparatus according to claim 1, in which the lower end of said outer cylindrical body has a plurality of hollow arms extending outwardly therefrom, said arms having generally horizontal liquid flow jetting ports directed substantially circumferentially of said outer cylindrical body for directing said liquid circumferentially of said outer cylindrical body.

19. In an apparatus for treating a liquid, the combination comprising:

an outer tank body;

a material solution feeding pipe extending upwardly in the central region of said outer tank body at the bottom thereof;

an inner cylindrical body extending upwardly in said outer tank body above said feeding pipe;

an outer cylindrical body surrounding said inner cylindrical body and defining therewith a first upright narrow zone which is open at its upper end, the bottom part of said outer cylindrical body being secured to said inner cylindrical body;

an inner tank body surrounding said outer cylindrical body and having a bottom wall and a cylindrical upper part defining with said outer cylindrical body a second upright narrow zone which is open at both ends, the lower part of said inner tank body being enlarged to form a condensing and mixing chamber and the said bottom wall of said inner tank body being secured to said inner cylindrical body so that said inner tank body is closed at its lower end;

a plurality of liquid flow jetting ports comprised of a plurality of non-radially directed nozzles at the lower end of the outer cylindrical body, said nozzles having axes which extend at least in part circumferentially of said inner tank body for directing liquid in a generally circumferential direction around the periphery of said outer cylindrical body and from the lower end of said first zone into said condensing and mixing chamber.

References Cited by the Examiner

UNITED STATES PATENTS

| | | | |
|---|---|---|---|
| 2,348,123 | 5/1944 | Green et al. | 210—49 |
| 2,353,358 | 7/1944 | Prager | 210—20 |
| 2,370,356 | 2/1945 | Kamp et al. | 210—197 |
| 2,433,458 | 12/1947 | Kahn et al. | 210—49 X |
| 2,669,440 | 2/1954 | Lindenbergh | 210—197 X |
| 2,825,691 | 3/1958 | Fischer | 210—49 |
| 3,038,608 | 6/1962 | Ochs | 210—194 X |

FOREIGN PATENTS

| | | |
|---|---|---|
| 147,860 | 8/1952 | Australia. |
| 42,919 | 4/1938 | Holland. |

REUBEN FRIEDMAN, *Primary Examiner.*

C. DITLOW, *Assistant Examiner.*